United States Patent
Park et al.

(10) Patent No.: US 8,941,798 B2
(45) Date of Patent: Jan. 27, 2015

(54) PANEL ACTING AS ACTIVE RETARDER, METHOD OF FABRICATING THE SAME, AND 3-DIMENSIONAL STEREOSCOPIC IMAGE DISPLAYABLE SYSTEM INCLUDING THE PANEL

(71) Applicant: LG Display Co., Ltd., Seoul (KR)

(72) Inventors: Jin-Woo Park, Gyeonggi-do (KR); Dong-Hoon Lee, Gyeonggi-do (KR); Young-Bok Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 118 days.

(21) Appl. No.: 13/726,741

(22) Filed: Dec. 26, 2012

(65) Prior Publication Data

US 2013/0314628 A1 Nov. 28, 2013

(30) Foreign Application Priority Data

May 22, 2012 (KR) .................. 10-2012-0054486

(51) Int. Cl.
*G02F 1/1335* (2006.01)
*G02F 1/1334* (2006.01)
*G02F 1/13* (2006.01)
(Continued)

(52) U.S. Cl.
CPC ........ *G02F 1/1334* (2013.01); *G02F 1/133536* (2013.01); *G02F 1/133528* (2013.01); *G02F 1/1313* (2013.01); *G02F 1/13363* (2013.01); *H04N 13/0434* (2013.01); *H04N 13/0452* (2013.01); *G02F 2203/62* (2013.01)
USPC .......................................................... 349/96

(58) Field of Classification Search
CPC .................. G02F 1/133528; G02F 1/133536
USPC .......................................................... 349/96
See application file for complete search history.

(56) References Cited

U.S. PATENT DOCUMENTS

| 4,944,576 A | 7/1990 | Lacker et al. |
| 6,246,451 B1 | 6/2001 | Matsumura et al. |
| 2005/0134750 A1 | 6/2005 | Yano |

(Continued)

FOREIGN PATENT DOCUMENTS

| CN | 1675579 A | 9/2005 |
| TW | 200532331 A | 10/2005 |

(Continued)

OTHER PUBLICATIONS

United Kingdom Office Action dated Nov. 29, 2014 for Application No. GB1308961.0.

(Continued)

*Primary Examiner* — Phu Vu
(74) *Attorney, Agent, or Firm* — Morgan, Lewis & Bockius LLP (57) ABSTRACT

A panel, a method of fabricating the panel, and a 3-dimensional (3D) image displayable system are provided. The panel includes first and second films disposed opposite each other, a polymer layer interposed between the first and second films, the polymer layer formed of a polymer having light alignment and light-curing characteristics, the polymer layer in which the polymer is arranged in one direction, and a plurality of liquid crystal (LC) droplets dispersed in the polymer layer. Each of the plurality of LC droplets includes a plurality of LC molecules, which are arranged in the same direction as the direction in which the polymer layer is arranged.

6 Claims, 6 Drawing Sheets

(51) Int. Cl.
*G02F 1/13363* (2006.01)
*H04N 13/04* (2006.01)

(56) References Cited

U.S. PATENT DOCUMENTS

2005/0206809 A1    9/2005   Kim et al.
2005/0244589 A1   11/2005   Kornfield et al.
2006/0256258 A1   11/2006   Kim et al.
2013/0335942 A1   12/2013   Kuriyama et al.

FOREIGN PATENT DOCUMENTS

TW    201219933 A    5/2012
WO    01/77255 A3   10/2001

OTHER PUBLICATIONS

Office Action dated Aug. 15, 2014 from the Taiwan Intellectual Property Office in counterpart patent application No. 101151226.

PANEL ACTING AS ACTIVE RETARDER, METHOD OF FABRICATING THE SAME, AND 3-DIMENSIONAL STEREOSCOPIC IMAGE DISPLAYABLE SYSTEM INCLUDING THE PANEL

The present application claims the priority benefit of Korean Patent Application No. 10-2012-0054486 filed in the Republic of Korea on May 22, 2012, which is hereby incorporated by reference in their entirety.

BACKGROUND

1. Field of the Disclosure

The present disclosure relates to a panel acting as an active retarder, and more particularly, to a panel using polymer-dispersion-type liquid crystals, a method of fabricating the panel, and a 3-dimensional stereoscopic image displayable system including a panel acting as an active retarder.

2. Discussion of the Related Art

In general, a liquid crystal display (LCD) device may include two opposite electrodes and an LC layer formed therebetween. LC molecules of the LC layer may be driven due to an electrical field generated by applying a voltage to two electrodes. The LC molecules may have polarization characteristics and optical anisotropy. The polarization characteristics refer to changing an arranged direction of LC molecules according to an electrical field due to crowding of charges into both sides of the LC molecules when the LC molecules are placed in the electrical field. Optical isotropy refers to varying a path or polarization state of emission light according to an incident direction or polarization state of incident light due to fine, long structures of the LC molecules and the above-described arranged direction of the LC molecules.

Thus, the LC layer may exhibit a difference in transmittance due to voltages applied to two electrodes, vary the difference according to each pixel, and display 2-dimensional (2D) images.

Meanwhile, owing to the increased demand for LCDs capable of expressing further realistic stereoscopic images, LCDs capable of displaying 3D stereoscopic images have lately been developed.

In general, 3D stereoscopic images may be formed based on the principle of binocular stereoscopic vision. Thus, LCDs capable of displaying stereoscopic images using binocular disparity caused by two eyes spaced about 65 mm apart from each other, have been proposed.

Formation of 3D images will now be described in further detail. Left and right eyes, which may view an image of an LCD device, may respectively see different 2D images. When the two 2D images are transmitted through the retinae to the brain, the brain may precisely merge the two 2D images and reproduce the senses of depth and reality of an original 3D image. This phenomenon is typically referred to as stereoscopy.

To display 3D stereoscopic images, 2D image display devices, such as LCD devices, may adopt a stereoscopic image display technique using special glasses, a glasses-free stereoscopic image display technique, or a holographic display technique.

In addition, a stereoscopic image display device using polarized glasses and an active retarder serving as a shutter capable of converting left and right images into each other, has lately been suggested.

Figure 1:
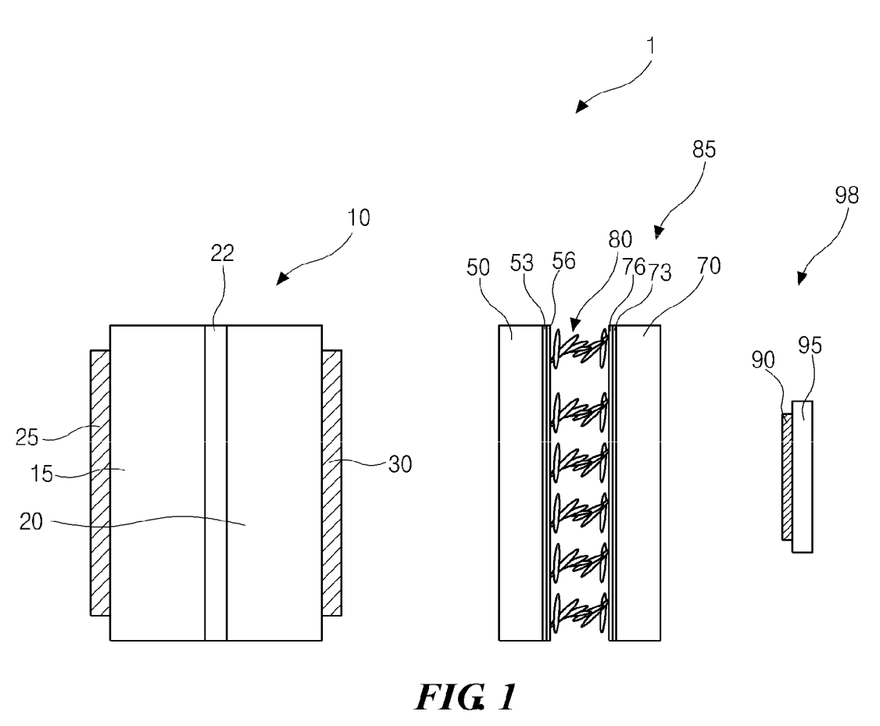
FIG. 1 is a cross-sectional view of a conventional stereoscopic image display device.

FIG. 1 is a cross-sectional view of a conventional stereoscopic image display device 1.

The conventional stereoscopic image display device 1 may broadly include an LC panel 10 including a first LC layer 22 and first and second polarizers 25 and 30, an active retarder panel 85, and polarized glasses 98.

In the case of the active retarder panel 85, first and second electrodes 53 and 73 may be disposed on inner side surfaces of two glass substrates 50 and 70 disposed opposite each other. Alignment layers 56 and 76 formed of a polymer, which may need a high-temperature process, may be formed on inner side surfaces of the first and second electrodes 53 and 73, respectively, and a second LC layer 80 may be formed between the alignment layers 56 and 76.

Accordingly, in the 3D image display device 1 including the active retarder panel 85 having the above-described construction, two glass substrates 15 and 20 may be used to form the LC panel 10, and two other glass substrates 50 and 70 may be required to fabricate the active retarder panel 85 including the alignment layers 56 and 76 that need a high-temperature process. Therefore, since the weight and volume of the 3D image display device 1 may increase, the conventional 3D image display device 1 may go against the recent trend toward lightweight, ultrathin display devices, preclude fabrication of large-area 3D image display devices, and comparatively increase fabrication costs.

SUMMARY OF THE INVENTION

Accordingly, the present invention is directed to an active retarder panel and a 3-dimensional image displayable system that substantially obviate one or more of the problems due to limitations and disadvantages of the related art.

An object of the present disclosure is to provide an active retarder panel and a 3D image displayable system, which may enable a low-temperature process performed at a temperature of about 100° C. or lower so that fabrication costs can be reduced without using relatively heavy glass substrates.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a panel includes: first and second films disposed opposite each other; a polymer layer interposed between the first and second films, the polymer layer formed of a polymer having light alignment and light-curing characteristics, the polymer layer in which the polymer is arranged in one direction; and a plurality of liquid crystal (LC) droplets dispersed in the polymer layer. Herein, each of the plurality of LC droplets includes a plurality of LC molecules, which are arranged in the same direction as the direction in which the polymer layer is arranged.

Transparent first and second electrodes may be respectively formed on inner side surfaces of the first and second films and in contact with the polymer layer. Alternatively, transparent first and second electrodes may be alternately formed on an inner side surface of any one of the first film or the second film.

The polymer layer and the plurality of LC droplets dispersed in the polymer layer may form a phase shift layer. When a voltage is applied to the first and second electrodes, a phase of light passing through the phase shift layer may be changed by shifting a direction in which the LC molecules included in the plurality of LC droplets are arranged.

In another aspect, a 3D image displayable system includes: a liquid crystal display (LCD) including an LC panel, a first polarizer formed on a first outer side surface of the LC panel, a second polarizer formed on a second outer side surface of the LC panel, and a backlight unit (BLU) disposed on an outer side surface of the first polarizer; a panel adhered to an outer side surface of the second polarizer, the panel including a first film and a second film disposed opposite each other, a polymer layer formed of a polymer having light alignment and light-curing characteristics, the polymer layer in which the polymer is arranged in one direction, and a plurality of LC droplets dispersed in the polymer layer, wherein each of the plurality of LC droplets contains a plurality of LC molecules arranged in the same direction as the direction in which the polymer layer is arranged; and polarized glasses to which a polarizer is adhered.

In another aspect, a method of fabricating a panel includes: coating a solution obtained by mixing a polymer having light-curing and light alignment characteristics with LCs on a first film to form a polymer LC material layer; irradiating linearly polarized ultraviolet (UV) light to the polymer LC material layer such that the polymer contained in the polymer LC material layer is arranged in one direction and cured, and the LCs are dispersed to form a plurality of LC droplets and a plurality of LC molecules contained in each of the LC droplets are arranged in the same direction as the direction in which the polymer is arranged; and adhering the second film to the polymer layer such that the second film is in contact with the polymer layer.

The method may further include forming a transparent first electrode on the first film, and forming a transparent second electrode on an inner side surface of the second film. Alternatively, the method may further include alternately forming transparent first and second electrodes on an inner side surface of any one of the first film or the second film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the exemplary embodiments, examples of which are illustrated in the accompanying drawings.

Hereinafter, construction of an active retarder panel according to an embodiment of the present invention will be described with reference to the appended drawings.

Figure 2A:
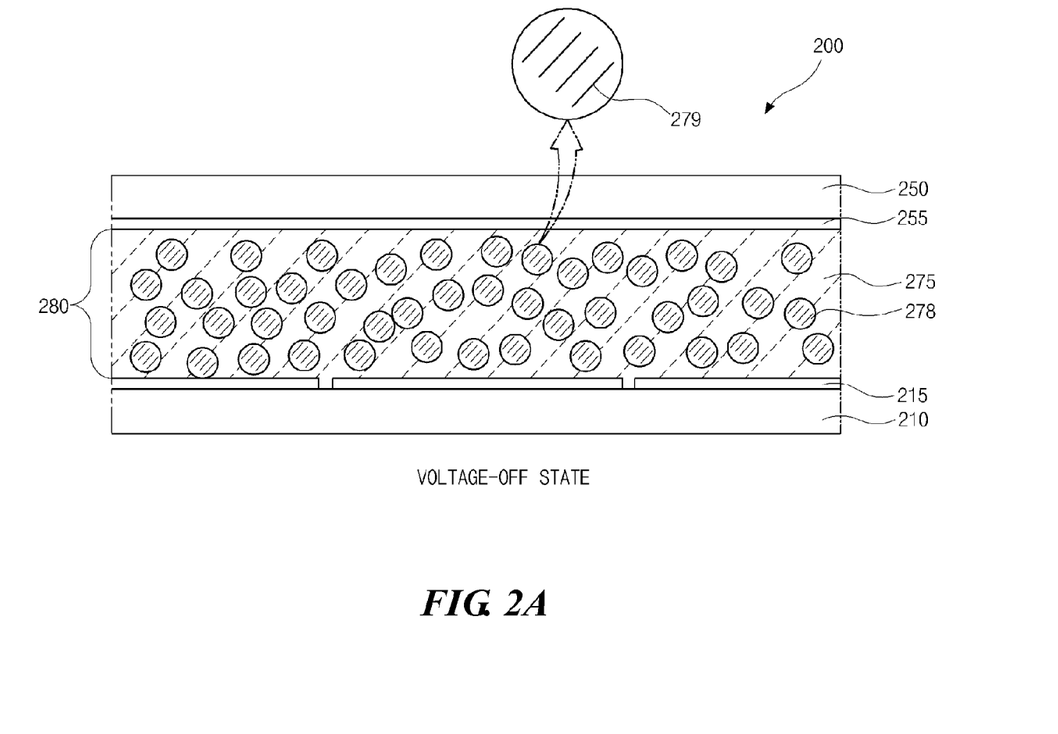
FIGS. 2A and 2B are cross-sectional views of an active retarder panel according to an embodiment of the present invention, which show a voltage-off state and a voltage-on state, respectively.
Figure 2B:
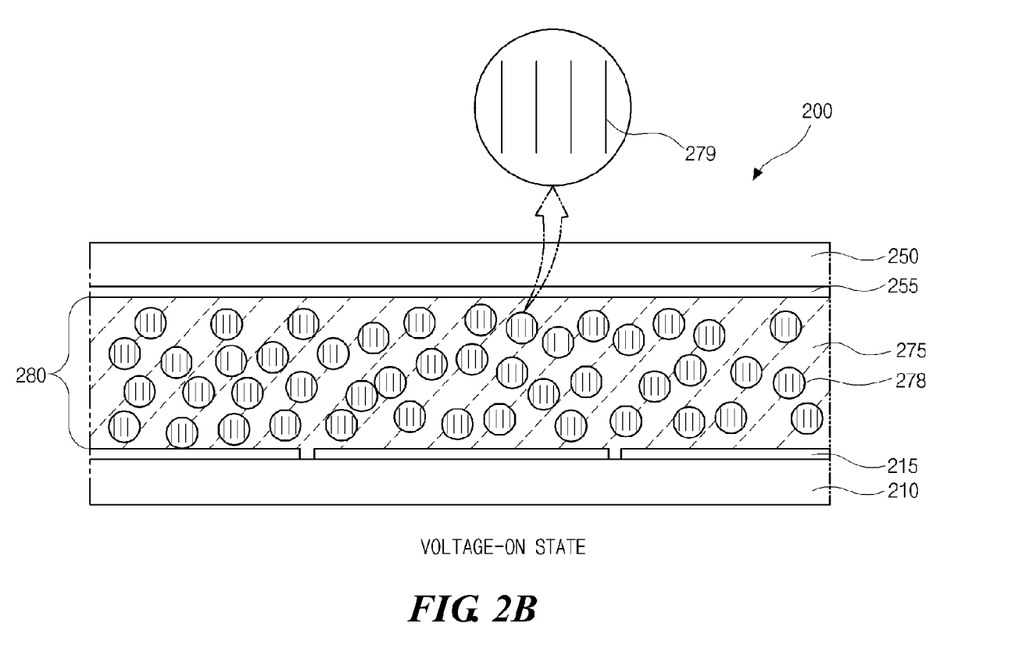

FIGS. 2A and 2B are cross-sectional views of an active retarder panel 200 according to an embodiment of the present invention, which show a voltage-off state and a voltage-on state, respectively.

Referring to FIGS. 2A and 2B, the active retarder panel 200 according to the embodiment of the present invention may include a phase shift layer 280 and first and second electrodes 215 and 255, which may be disposed between first and second films 210 and 250 having flexibility. The phase shift layer 280 may include a polymer 275 and a plurality of dispersed LC droplets 278. The first and second electrodes 215 and 255 may be formed of a transparent conductive material. A voltage for changing a position of LC molecules 279 contained in the LC droplets 278 dispersed in the phase shift layer 280 may be applied to the first and second electrodes 215 and 255.

In this case, the polymer 275 may be a light alignment polymer, which may be arranged in a specific direction and cured during irradiation of ultraviolet (UV) light polarized in one direction. The LC droplets 278 may include LC nanoparticles with a nanoscale size.

Meanwhile, in the active retarder panel 200 having the above-described construction, since the polymer 275 disposed around the plurality of LC nanoparticles contained in the LC droplets 278 may be arranged in one direction and have directionality, the plurality of LC nanoparticles may be affected by the directionality of the polymer 275 and aligned in the same direction as the direction in which the polymer 275 is arranged, without application of any voltage.

In the active retarder panel 200 having the above-described construction, as compared with the conventional active retarder panel (refer to 85 in FIG. 1) including the LC layer (refer to 80 in FIG. 1) and the alignment layers (refer to 56 and 76 in FIG. 1), an alignment layer that is cured using a high-temperature process performed at a temperature of about 200° C. or higher may be omitted. The active retarder panel 200 may include the polymer 275, which may be cured due to UV light and arranged in one direction during irradiation of UV light polarized in one direction, instead of the alignment layer, so the high-temperature process performed at a temperature of about 200° C. or higher may not be required.

Accordingly, since it is unnecessary to adopt a glass substrate, which is less deformed at a high temperature of about 200° C. to about 400° C., the active retarder panel 200 may be fabricated using an economical, flexible film.

Furthermore, since the LC droplets 278 are affected by the light-aligned polymer 275 disposed adjacent thereto and remain arranged in one direction, the quantity (or luminance) of light transmitted may be controlled according to a voltage applied through the first and second electrodes 215 and 255. Simultaneously, response speed may be improved when the voltage is applied or is not applied as compared with the case in which the LC molecules 279 are randomly disposed in the LC droplets 278 without directionality.

In this case, a phase value of light passing through the phase shift layer 280 may be changed by varying the thickness of the phase shift layer 280 and an anisotropic refractive index of the LC molecules 279 of the LC droplets 278. Thus, the active retarder panel 200 according to the embodiment of the present invention may serve as a phase plate having a phase value of about $\lambda/4$ to about $\lambda/2$ by appropriately controlling the thickness of the phase shift layer 280 and the anisotropic refractive index.

Meanwhile, the first and second films 210 and 250, which are components of the active retarder panel 200 according to the embodiment of the present invention, may be formed of a flexible material, for example, any one of poly(ethylene naphthalate) (PEN), triacetylcellulose (TAC), polycarbonate (PC), poltmethylmethacrylate (PMMA), polyether sulfone (PES), polyimide (PI), and cyclic olefin copolymer (COC).

The first and second films 210 and 250 may be formed of a material having a retardation of about 20 nm or less, more precisely, about 0 nm to about 20 nm, which may hardly affect a shift in the phase of light passing through the first and second films 210 and 250.

FIGS. 2A and 2B exemplarily illustrate that the first electrode 215 is formed on an inner side surface of the first film 210, which is in contact with the phase shift layer 280, while the second electrode 255 is formed on an inner side surface of the second film 250, and thus the active retarder panel 200 according to the embodiment of the present invention operates due to a vertical electrical field formed between the electrodes 215 and 250 disposed opposite each other. However, the first and second electrodes 215 and 250 may be alternately formed on the inner side surface of any one of the first film 210 or the second film 250. In this case, the LC molecules 279 of the LC droplets 278 may operate due to a transverse field.

Figure 3:
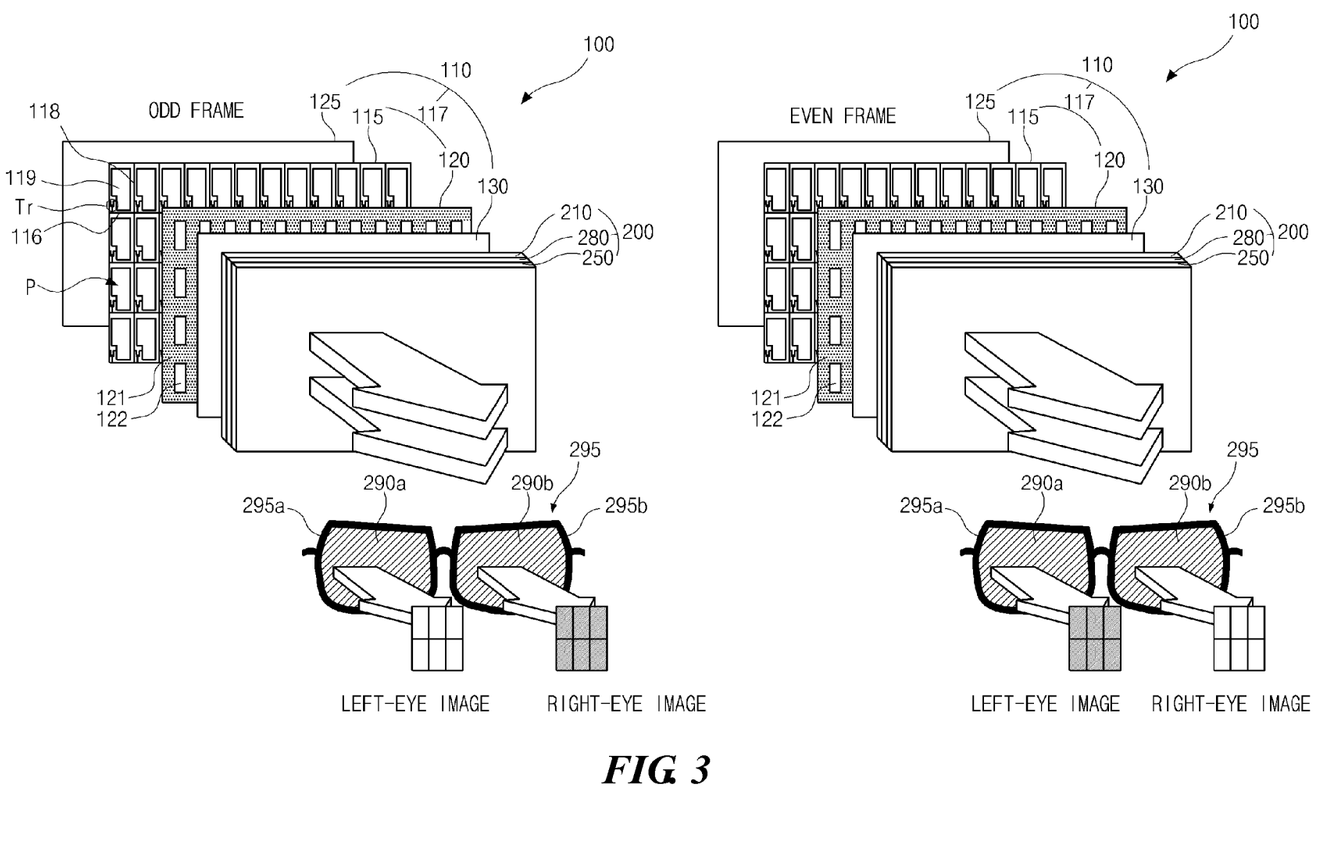
FIG. 3 is a stereoscopic perspective view of a 3-dimensional (3D) image displayable system including an active retarder panel according to an embodiment of the present invention.
Figure 4:
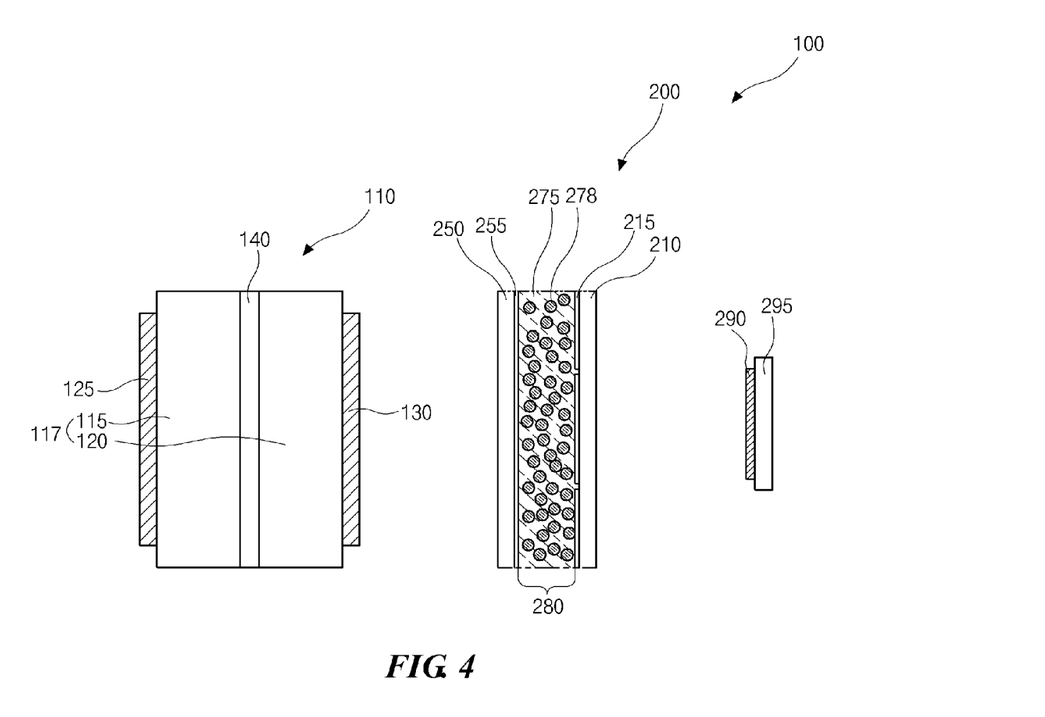
FIG. 4 is a schematic cross-sectional view of the 3D image displayable system including the active retarder panel according to the embodiment of the present invention.

FIG. 3 is a stereoscopic perspective view of a 3-dimensional (3D) image displayable system 100 including an active retarder panel 200 according to an embodiment of the present invention, and FIG. 4 is a schematic cross-sectional view of the 3D image displayable system 100 including the active retarder panel 200 according to the embodiment of the present invention.

The 3D image displayable system 100 according to the embodiment of the present invention may broadly include an LCD 110 configured to display 2D images, an active retarder panel 200 including a first film 210, a second film 250, and a phase shift layer 280 interposed between the first and second films 210 and 250 and configured to operate in synchrony with the drive of the LCD 110, and polarized glasses 295.

The construction of the 3D image displayable system 100 according to the embodiment of the present invention will now be described in further detail.

The LCD 110 may include an LC panel 117, first and second polarizers 125 and 130 adhered to an outer side surface of the LC panel 117 and disposed orthogonal to each other, and a backlight unit (BLU) (not shown) disposed on an outer side surface of the first polarizer 125.

In this case, the LC panel 117 may include an array substrate 115 having an array device (not shown), a color filter substrate 120 including a color filter layer 122, and an LC layer 140 interposed between the array substrate 115 and the color filter substrate 120.

Gate and data lines 116 and 118 may be disposed on the array substrate 115 to intersect each other and define a plurality of pixel regions P. Thin-film transistors (TFTs) serving as switching devices may be connected to the gate and data lines 116 and 118, and respectively disposed in pixel regions P. Pixel electrodes 119 may be respectively disposed in the pixel regions P and connected to drain electrodes of the TFTs Tr.

Black matrices 121 may be disposed on the color filter substrate 120 to correspond to boundaries between the respective pixel regions P. A color filter layer 122 may include red (R), green (G), and blue (B) color filter patterns, which may correspond to the respective pixel regions P and are sequentially repetitively formed. A common electrode (not shown) may be disposed on the entire surface of the color filter substrate 120 to cover the color filter layer 122.

In the LC panel 117 having the above-described construction, LC molecules of the first LC layer 140 may move due to a vertical electric field generated between the pixel electrode 119 and the common electrode disposed on the different substrates 115 and 120 to display color images.

First and second polarizers 125 and 130 may be adhered to both outer side surfaces of the LC panel 117 such that transmission axes of the first and second polarizers 125 and 130 are orthogonal to each other. A BLU (not shown) may be disposed on an outer side surface of the first polarizer 125.

In this case, when the LC panel 117 is viewed from the front, the transmission axis of the second polarizer 130 may form an angle of about 45° with the gate line 116 that is typically disposed parallel to the ground.

The present embodiment pertains to an example in which the LC panel 117 generates a vertical electrical field due to the pixel electrode 119 formed on the array substrate 115 and the common electrode formed on the color filter substrate 120. However, in another embodiment, the LC panel 117 may include pixel electrodes and common electrodes, which may alternate with one another in bar shapes and be formed a predetermined distance apart from one another on the array substrate 115.

Meanwhile, the active retarder panel 200, which is the outstanding feature of the present invention, may be adhered to an outer side surface of the second polarizer 130 to correspond to the LCD 117 having the above-described construction.

Since the construction of the active retarder panel 200 is described in detail with reference to FIGS. 2A and 2B, a description thereof is omitted.

Meanwhile, when the phase shift layer 280 is appropriately controlled to have a phase retardation of about $\lambda/2$, the active retarder panel 200 may act as a shutter capable of putting light transmitted through the second polarizer 130 into a left-linearly polarized light state or right-linearly polarized light state.

That is, the phase shift layer 280 interposed between the first and second films 210 and 250 may react to a vertical electrical field generated by the first and second electrodes 215 and 255 disposed on outer sides of the phase shift layer 280. Thus, when a phase value of light passing through the phase shift layer 280 is appropriately controlled with the application of the vertical electrical field, light passing through the second polarizer 130 may be put into a left-linearly polarized state and a right-linearly polarized state. Also, when the vertical electrical field is not applied, the phase shift layer 280 may serve to simply transmit 2D images.

Accordingly, the active retarder panel 200 may function as a switch capable of allowing a user to selectively watch 2D or 3D images.

Meanwhile, when the active retarder panel 200 is turned on, the left-linearly polarized light and right-linearly polarized light passing through the active retarder panel 200 may be finally incident to the polarized glasses 295. In this case, a first polarizer 290a configured to transmit only left-linearly polarized light may be disposed on a left-eye lens 295a of the polarized glasses 150, and a second polarizer 290b configured to transmit only right-linearly polarized light may be disposed on a right-eye lens 295b thereof. Thus, a left-eye image displayed by an odd frame may be incident from the LC panel 110 to a user's left eye, and a right-eye image displayed by an even frame may be incident from the LC panel 110 to the user's right eye so that the user can view 3D stereoscopic images.

The 3D image displayable system 100 having the above-described construction according to the embodiment of the present invention may be made lightweight and ultrathin and fabricated at low cost because the active retarder panel 200 may be formed using a film.

Meanwhile, the present embodiment pertains to an example in which the active retarder panel 200 serves an original function as a component of the 3D image displayable system 100 and changes of the phase of light. However, in another embodiment, when polarizers having transmission axes perpendicular to each other are formed on an outer side surface of the active retarder panel 200, the quantity of light transmitted may be adjusted by controlling application/elimination of a voltage and the intensity of an applied voltage. Thus, the active retarder panel 200 may include an applied voltage control switch and serve as a smart window configured to allow a user to control the transmittance of light.

Hereinafter, a method of fabricating an active retarder panel, which is the outstanding feature of the present invention, will be described.

Figure 5A:
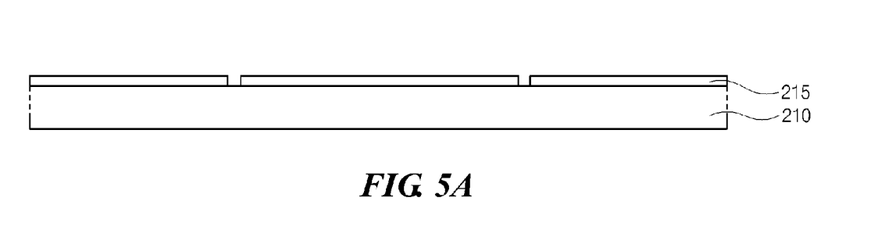
FIGS. 5A through 5C are cross-sectional views illustrating respective process operations of a method of fabricating an active retarder panel according to an embodiment of the present invention.
Figure 5B:
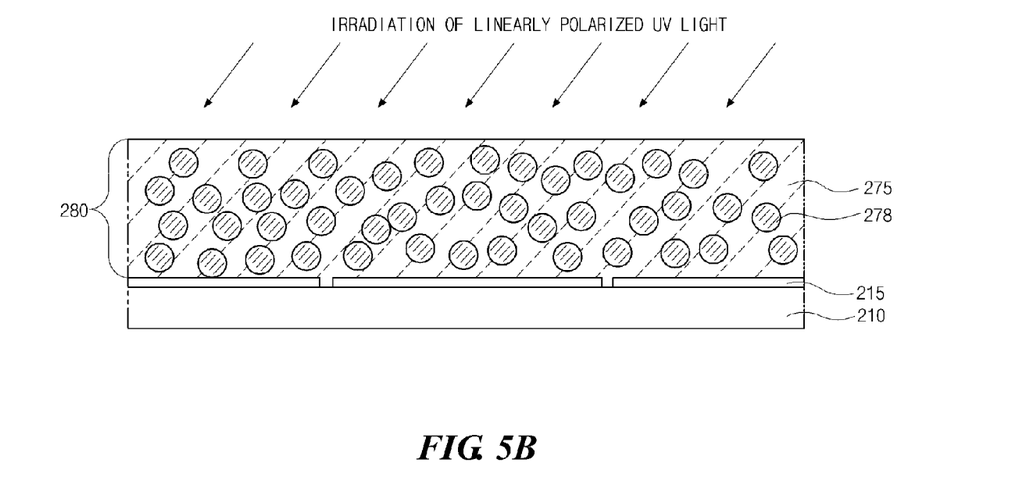
Figure 5C:
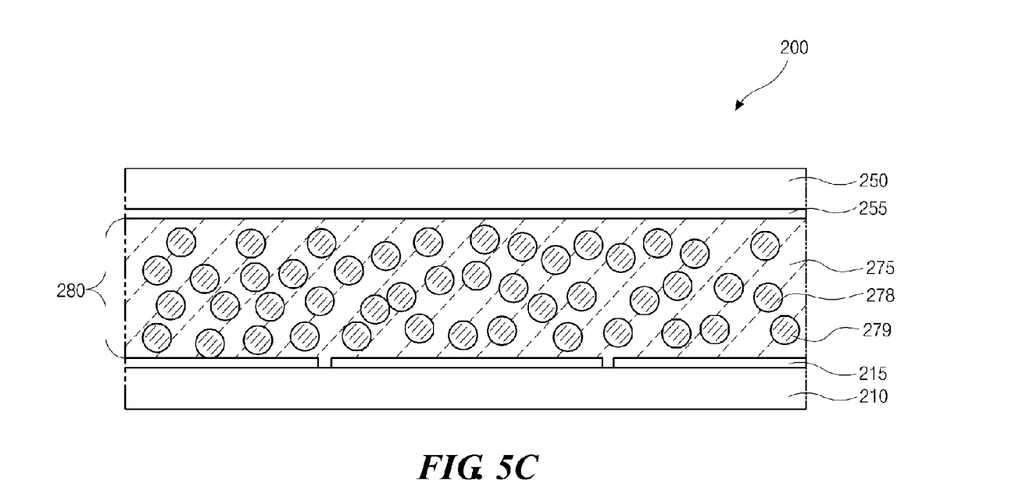

FIGS. 5A through 5C are cross-sectional views illustrating process operations of a method of fabricating an active retarder panel 200 according to an embodiment of the present invention.

To begin with, as shown in FIG. 5A, a transparent conductive material may be deposited on a first film 210 and patterned using a mask process, thereby forming a first electrode 215. The first film 210 may be formed of any one flexible material selected from the group consisting of PET, TAC, PC, PMMA, PES, PI, and COC. The transparent conductive material may be, for example, indium tin oxide (ITO) or indium zinc oxide (IZO).

Next, as shown in FIG. 5B, a solution obtained by appropriately mixing a polymer 275 having light alignment and light-curing characteristics with LCs may be coated on the first electrode 215 to form a polymer LC material layer (not shown). The polymer LC material layer may be irradiated with linearly polarized UV light so that the polymer 275 may be aligned in one direction with respect to the polymer LC material layer and cured.

In this case, phase separation may occur between the polymer 275 and the LCs by appropriately controlling the intensity of UV light and irradiation time so that LC droplets 278 can be formed in the polymer 275. Simultaneously, the LC molecules 279 may be affected by the polymer 275 arranged in one direction, and arranged in the LC molecules 278 in the same direction as the polymer 275.

Due to the above-described process, a phase shift layer 280 in which the LC droplets 278 including the LC molecules 279 arranged in one direction are dispersed in the polymer 275, may be formed on the first electrode 215.

Subsequently, as shown in FIG. 5C, a transparent conductive material may be deposited on a second film 250 to form a second electrode 255. The second film 250 may be disposed over the first film 210 such that the second electrode 255 faces and is on the phase shift layer 280, and the second film 250 and the first film 210 adhered to each other, thereby completing fabrication of the active retarder panel 200 according to the present invention.

Although not shown, an adhesive layer (not shown) may be further interposed between the second electrode 255 and the phase shift layer 280.

Instead of the previously cut first and second films 210 and 250, the fabrication of the active retarder panel 200 may be completed by performing a roll-to-roll process using a roll (not shown) around which the first film 210 is wound, and a roll (not shown) around which the second film 250 is wound, and a subsequent cutting process.

Meanwhile, the method according to the present embodiment pertains to an example in which the first electrode 215 is formed on the first film 210, and the second electrode 255 is formed on the inner side surface of the second film 250. However, in another embodiment, the first and second electrodes 215 and 250 may be alternately formed on any one of the first film 210 or the second film 250.

The active retarder panel 200 completed as described above may use a flexible film instead of a glass substrate because a process performed at a high temperature of about 200° C. or more is not required. Thus, fabrication costs may be reduced, and price competitiveness may increase.

Furthermore, the active retarder panel 200 may be made lightweight and ultrathin in contrast to a conventional active retarder panel using a glass substrate. Also, a 3D image displayable system may also be fabricated at low cost and follow the latest trend toward lightweight, ultrathin display devices.

An active retarder panel according to the present invention can include a polymer having light alignment and light-curing characteristics and dispersed LC droplets including LC nanoparticles. Thus, since a process performed at a high temperature of about 200° C. or higher is not required, the active retarder panel according to the present invention can be formed using a plastic film.

Accordingly, the active retarder panel according to the present invention can be fabricated to be lightweight and ultrathin, as compared with a conventional active retarder panel using a glass substrate, thereby reducing fabrication costs.

Furthermore, a 3D image displayable system including the active retarder panel having the above-described construction can be fabricated at low cost and follow the latest trend toward lightweight, ultrathin display devices.

It will be apparent to those skilled in the art that various modifications and variations can be made in a display device of the present disclosure without departing from the sprit or scope of the invention. Thus, it is intended that the present invention covers the modifications and variations of this invention provided they come within the scope of the appended claims and their equivalents.

What is claimed is:

1. A panel comprising:
   first and second films disposed opposite each other;
   a polymer layer interposed between the first and second films, the polymer layer formed of a polymer having light alignment and light-curing characteristics, the polymer layer in which the polymer is arranged in one direction; and
   a plurality of liquid crystal (LC) droplets dispersed in the polymer layer,
   wherein when a voltage is not applied across the polymer layer, each of the plurality of LC droplets includes a plurality of LC molecules, which are arranged in the same direction as the direction in which the polymer layer is arranged, and the panel transmits light, and
   wherein when a voltage is applied across the polymer layer, the polymer layer with the plurality of LC droplets has a phase retardation of $\lambda/2$, and the panel changes light transmitted through a polarizer into a left-linearly polarized light state or right-linearly polarized light state.

2. The panel of claim 1, wherein transparent first and second electrodes are respectively formed on inner side surfaces of the first and second films and in contact with the polymer layer, or alternately formed on an inner side surface of any one of the first film or the second film.

3. The panel of claim 2, wherein the polymer layer and the plurality of LC droplets dispersed in the polymer layer form a phase shift layer, wherein when a voltage is applied to the first and second electrodes, a phase of light passing through the phase shift layer is changed by shifting a direction in which the LC molecules included in the plurality of LC droplets are arranged.

4. A 3-dimensional (3D) image displayable system comprising:

a liquid crystal display (LCD) including an LC panel, a first polarizer formed on a first outer side surface of the LC panel, a second polarizer formed on a second outer side surface of the LC panel, and a backlight unit (BLU) disposed on an outer side surface of the first polarizer;

a panel adhered to an outer side surface of the second polarizer, the panel including a first film and a second film disposed opposite each other and a polymer layer interposed between the first and second films, the polymer layer formed of a polymer having light alignment and light-curing characteristics, the polymer layer in which the polymer is arranged in one direction, and a plurality of LC droplets dispersed in the polymer layer, wherein when a voltage is not applied across the polymer layer, each of the plurality of LC droplets contains a plurality of LC molecules arranged in the same direction as the direction in which the polymer layer is arranged, and the panel transmits light; and polarized glasses to which a polarizer is adhered, wherein when a voltage is applied across the polymer layer, the polymer layer with the plurality of LC droplets has a phase retardation of $\lambda/2$, and the panel changes light transmitted through the second polarizer into a left-linearly polarized light state or right-linearly polarized light state.

5. A method of fabricating a panel, comprising:

coating a solution obtained by mixing a polymer having light-curing and light alignment characteristics with LCs on a first film to form a polymer LC material layer;

irradiating linearly polarized ultraviolet (UV) light to the polymer LC material layer such that the polymer contained in the polymer LC material layer is arranged in one direction and cured, and the LCs are dispersed to form a plurality of LC droplets in a polymer layer and a plurality of LC molecules contained in each of the LC droplets are arranged in the same direction as the direction in which the polymer layer is arranged; and adhering the second film to the polymer layer such that the second film is in contact with the polymer layer, wherein when a voltage is not applied across the polymer layer, the panel transmits light, and wherein when a voltage is applied across the polymer layer, the polymer layer with the plurality of LC droplets has a phase retardation of $\lambda/2$, and the panel changes light transmitted through a polarizer into a left-linearly polarized light state or right-linearly polarized light state.

6. The method of claim 5, further comprising forming a transparent first electrode on the first film, and forming a transparent second electrode on an inner side surface of the second film, or alternately forming transparent first and second electrodes on an inner side surface of any one of the first film or the second film.

* * * * *